(No Model.)

T. R. CRANE.
GRAIN DRILL.

No. 484,630. Patented Oct. 18, 1892.

Witnesses
J. C. Mattoon.
Frank P. Davis.

Inventor:
Thos. R. Crane,
By Chas. B. Mann
Attorney.

THE NORRIS PETERS CO., PHOTO-LITHO., WASHINGTON, D. C.

UNITED STATES PATENT OFFICE.

THOMAS R. CRANE, OF HEATHSVILLE, VIRGINIA.

GRAIN-DRILL.

SPECIFICATION forming part of Letters Patent No. 484,630, dated October 18, 1892.

Application filed February 12, 1892. Serial No. 421,238. (No model.)

*To all whom it may concern:*

Be it known that I, THOMAS R. CRANE, a citizen of the United States, residing at Heathsville, in the county of Northumberland and State of Virginia, have invented certain new and useful Improvements in Feed Devices for Grain-Drills, of which the following is a specification.

This invention relates to an improvement in feed devices for grain-drills which employ feed-shafts. The common form of feed-shaft has a pair of collars at each feed box or cup, with the grain depressions or serrations between said collars. When necessary to clean this feed-shaft, it having become obstructed or clogged with wheat-beards, chaff, or any other foreign substance, with the present construction the grain has to be removed from the hopper and the feed rod or shaft turned until the obstructed part is brought opposite the discharge-opening in the bottom of the hopper. A pointed instrument is then used to pick the obstruction out. This is a very tedious and unsatisfactory plan for removing the obstruction, and when the grain is not perfectly clean the cups or feed-boxes are becoming constantly clogged, and thereby prevent the regular discharge of the grain. If the shaft is drawn out until the collars leave the boxes or cups to gain access to the grain depressions, said collars will drop down below the feed-boxes, and for this reason great difficulty would be experienced in replacing the shaft in working position.

The object of my present invention is to overcome the difficulty heretofore experienced in cleaning the shaft and at the same time employ the ordinary form of feed box or cup.

To this end the invention consists in the novel construction and combination of parts hereinafter described and claimed.

The invention is illustrated in the accompanying drawings, in which—

Figure 1:
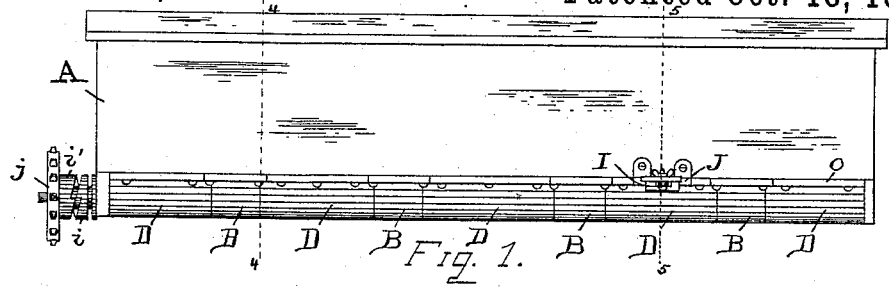
Figure 2:
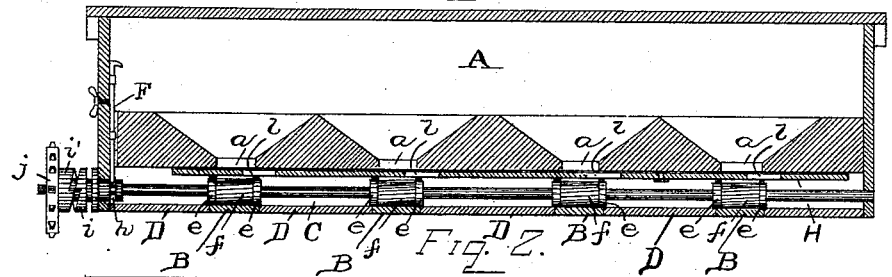
Figure 3:
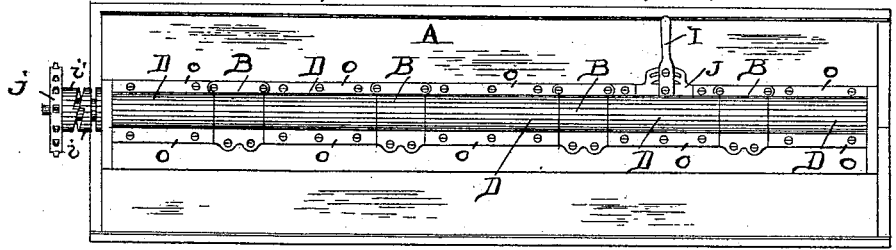
Figures 4, 6:
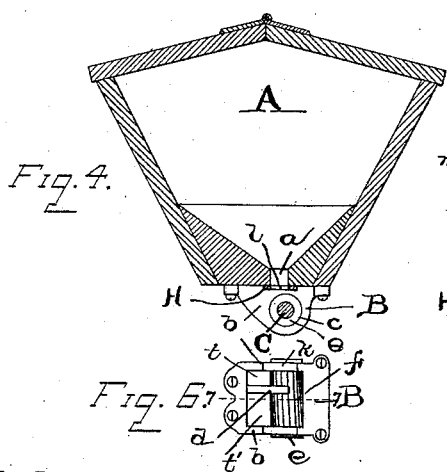
Figures 5, 7, 8:
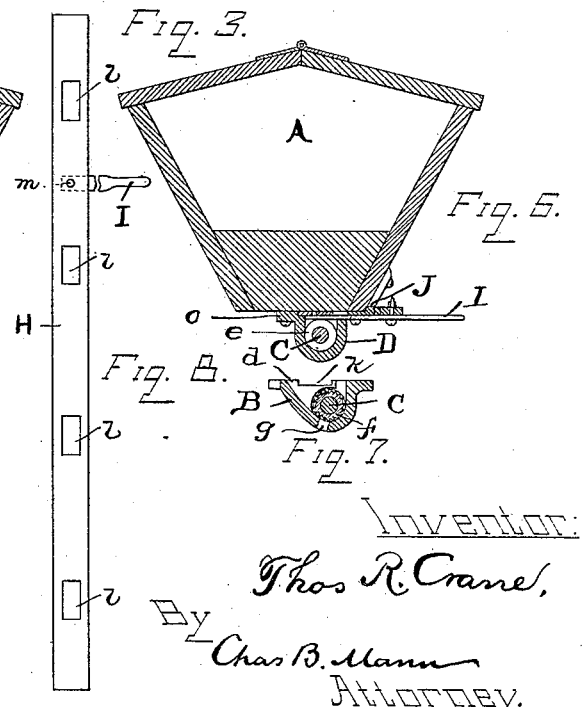

Figure 1 is a rear elevation of the hopper with feed devices detached; Fig. 2, a longitudinal section of the same; Fig. 3, a bottom view; Fig. 4, a cross-section on line 4 4 of Fig. 1; Fig. 5, a cross-section on line 5 5 of Fig. 1; Fig. 6, a detail top view of one of the feed-boxes with the shaft through it; Fig. 7, a section on line 7 7 of Fig. 6, and Fig. 8 a detail of a cut-off slide employed.

The letter A designates the hopper, which has equidistant discharge-openings $a$ through its bottom and sloping sides around the said openings. A feed box or cup B is secured to the bottom of the hopper below each of said openings and has sides $b$, with circular openings $c$ for the feed-shaft. The box or cup is divided by a partition $d$ to form exits $t\ t'$ of different size for different grain that may be placed in the hopper. The feed-shaft C extends through all the boxes from one end of the hopper to the other, having bearings in the ends of the hopper, and this shaft has collars $e$, fitting snugly in the openings $b$ in the sides of the hopper and including between them the serrated sleeve $f$ for feeding the grain through the openings $g$ in the front of the cup.

To facilitate the withdrawal of the shaft and overcome the difficulty heretofore experienced in cleaning the shaft, I provide semi-tubular casings D, which are fitted over the shaft between the feed-boxes and secured to the hopper-bottom through flanges $o$. These casings completely cover the shaft between the boxes, and their inner surfaces are flush with the lower half of the openings $b$ in the sides of the boxes. It will be seen the casings form guides for the collars $e$ of the shaft and keep them always in line with the openings in the sides of the feed-boxes. With this construction the shaft may be entirely withdrawn to clean it and as readily replaced. A sliding bolt F on the inside of the hopper holds the shaft in place by engaging in the groove $h$ therein, and said shaft has a clutch $i\ i'$, of ordinary construction, and a sprocket-wheel $j$ to connect it with driving mechanism which imparts to it a rotary motion. A cut-off slide H works between the hopper and feed boxes or cups in suitable slideways $k$ in the latter and in the casings D. This slide has openings $l$ to register with the discharge-openings in the hopper and the openings $t\ t'$ in the boxes and may be adjusted to close one of said openings in a box and open the other, or vice versa, or to completely cut off the grain. The cut-off slide is operated by means of a lever I, pivoted to it at $m$ and extending through a slot in the casing D out to one side of the hopper, where it is pivoted to a bracket J, secured to the hopper and having suitable marks to indicate the position of the lever for the cut-off and open adjustments.

By my invention the withdrawal of the feed-shaft is greatly facilitated by providing a continuous guide to prevent its collars from falling below the feed-boxes. With this construction no difficulty will be experienced in cleaning the feed-shaft, which will be accomplished by first shifting the lever I to cut off the grain, then giving the feed-shaft a few turns to discharge what grain it may have in the sleeve or feed-cups and withdrawing the shaft entirely from its casing, when it can be quickly cleaned and replaced.

My invention does not require any change in the construction of the feed-boxes, which will confine the grain in the usual way, and it is an inexpensive arrangement which may be readily applied.

My former patent, No. 363,604, dated May 24, 1887, shows a continuous tube around the shaft; but a special construction is there required, which I avoid in my present arrangement and employ the usual form of feed boxes or cups.

Having thus described my invention, what I claim as new, and desire to secure by Letters Patent, is—

The combination of the feed boxes or cups secured to the bottom of the hopper below the discharge-openings thereof and having sides with circular openings therethrough, a feed-shaft extending through the said boxes and having collars which snugly fit the openings in the sides of the latter and include between them the grain depressions, and semi-tubular casings covering the shaft between the boxes and having their inside surfaces flush with the openings in the sides of the boxes or cups, substantially as and for the purpose described.

In testimony whereof I affix my signature in the presence of two witnesses.

THOMAS R. CRANE.

Witnesses:
  JNO. T. MADDOX,
  FRANK PARKER DAVIS.